United States Patent [19]

Revell

[11] 4,266,956
[45] May 12, 1981

[54] FILTER CLAMPING DEVICE
[75] Inventor: Alan Revell, Louisville, Ky.
[73] Assignee: American Air Filter Company, Inc., Louisville, Ky.
[21] Appl. No.: 106,464
[22] Filed: Dec. 26, 1979
[51] Int. Cl.³ ............................................. B01D 39/00
[52] U.S. Cl. ...................................... 55/478; 55/493; 55/504; 210/241
[58] Field of Search ................. 55/480, 481, 493, 506, 55/504, 478; 210/236, 237, 241, 238; 403/43, 45, 343; 254/126; 292/256.75; 285/9, 310; 277/101

[56] References Cited

U.S. PATENT DOCUMENTS

| | | | |
|---|---|---|---|
| 3,064,818 | 11/1962 | Kasten | 55/481 |
| 3,393,498 | 7/1968 | Schoen | 55/493 |
| 3,423,908 | 1/1969 | Hart | 55/481 |
| 3,593,503 | 7/1971 | Andrews | 55/481 |
| 3,816,984 | 6/1974 | Neumann | 55/502 |
| 4,124,361 | 11/1978 | Revell | 55/493 |

Primary Examiner—David L. Lacey
Attorney, Agent, or Firm—Jon C. Winger

[57] ABSTRACT

A clamping device for removably clamping a unit filter cell in position in a gas flow-through housing against a stationary gas flow-through frame structure includes a filter cell support tray selectively movable toward and away from the gas flow-through frame structure, thus, moving a unit filter cell supported on the tray into and out of contact, respectively, with the flow-through frame structure. The tray is moved through a plurality of pivotable levers which are each pivotably attached at one end to a stationary support and connected between its ends to the filter cell support tray. The levers are caused to pivot by means of bars which are connected to the other ends of the lever and are themselves mounted for selective linear movement along their longitudinal axes. Biasing means structurally associated with the pivotable levers cause a uniform clamping force to be applied by the filter support tray forcing the unit filter cell against the stationary support frame.

10 Claims, 11 Drawing Figures

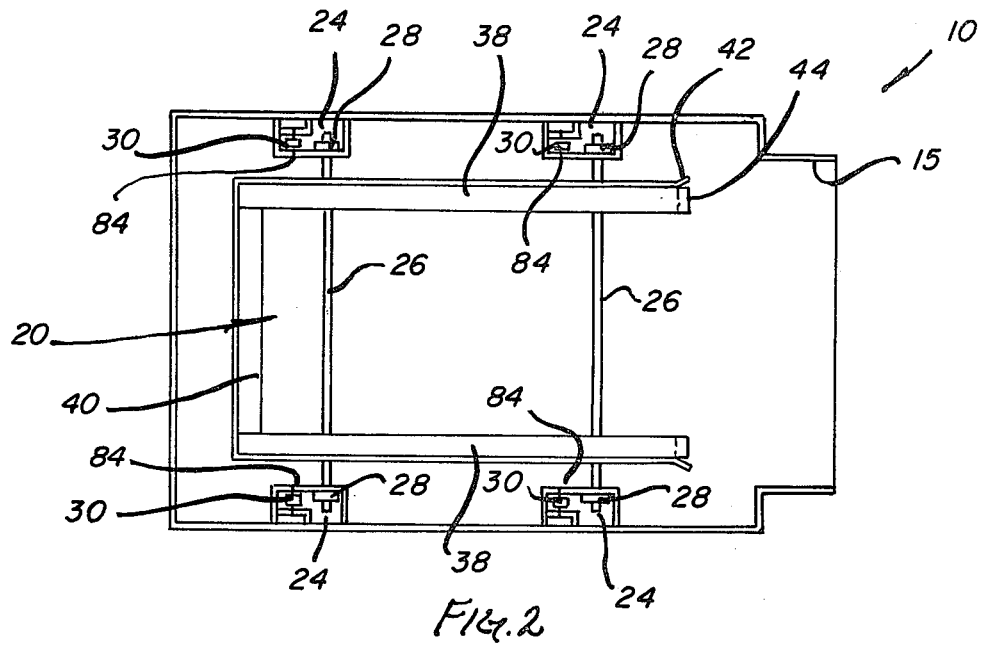
FIG. 2
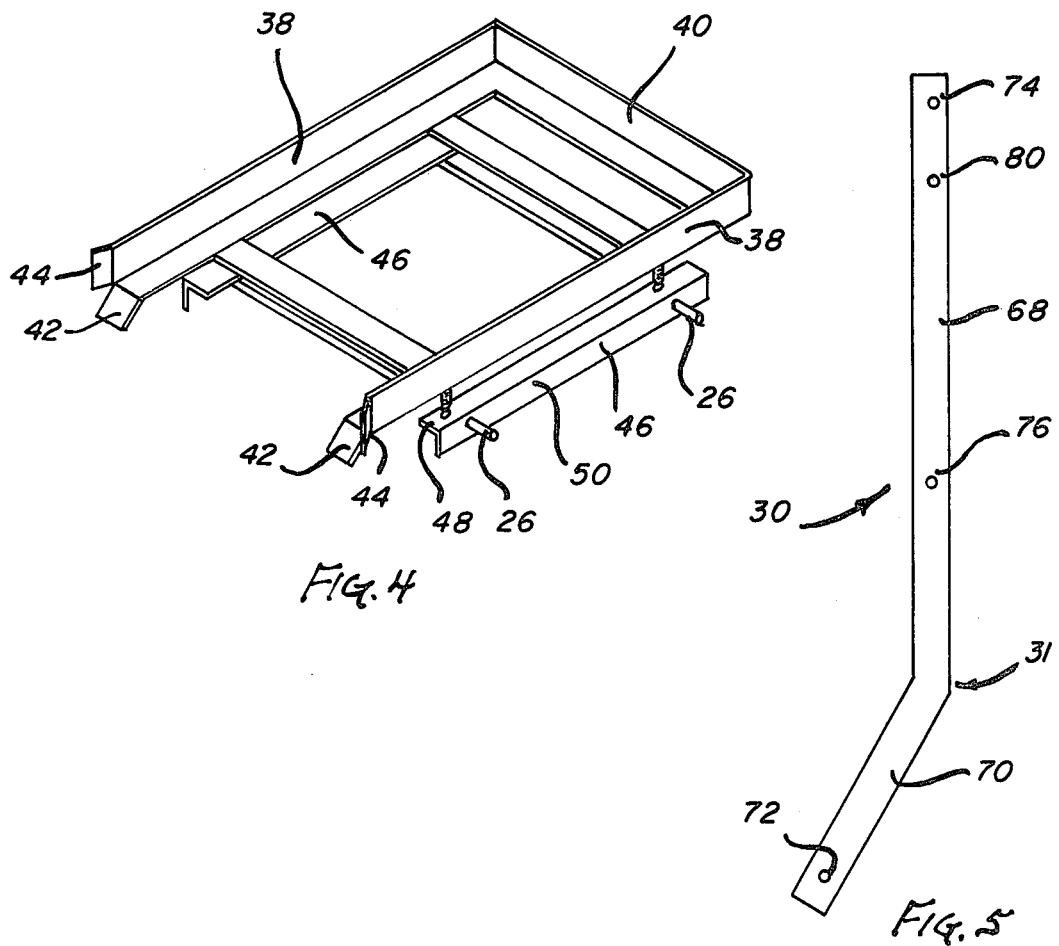
FIG. 4
FIG. 5

FILTER CLAMPING DEVICE

BACKGROUND OF THE INVENTION

The present invention pertains to means for securing or retaining a gas separating device to a suitable frame, and more particularly to a unit filter cell clamping device having a tray for supporting a unit filter cell and forcing it against a suitable frame to hold the unit filter cell in the gas flow stream.

Various unit filter cell retaining latch assemblies or unit filter cell clamping devices are known.

Exemplary of these prior art devices are: U.S. Pat. No. 3,393,498 issued on July 23, 1968 to D. W. Schoen; U.S. Pat. No. 3,593,503 issued on July 20, 1971 to Paul D. Andrews; and U.S. Pat. No. 3,816,984 issued on June 18, 1974 to Gerhard Max Neumann.

A unit filter cell clamping device used to clamp a unit filter cell against a frame structure should apply a substantially uniform clamping force against the unit filter cell. A non-uniform clamping force applied to the unit filter cell will prevent the unit filter cell from seating squarely against the frame structure which could result in a path for gas to by-pass the filter. A non-uniform clamping force could also exert a strain on the unit filter cell which could cause it to fracture or warp.

Further, a unit filter cell clamping device should be compact in construction and capable of being actuated with minimum movement to conserve space and, therefore, cost.

In addition, the unit filter cell clamping device should be capable of being actuated with a minimum of effort and in a minimum amount of time.

SUMMARY OF THE INVENTION

The present invention recognizes these desirable attributes and provides a unit filter cell clamping device which not only satisfies them, but one which is also straightforward in construction and, therefore, relatively inexpensive to manufacture as well as maintain in good operating condition.

More particularly, the present invention provides a clamping device for removably clamping a unit filter cell in position against a flow-through unit filter seating structure to filter contaminates from a gas stream passing through the flow-structure, the clamping device comprising:

- a movable filter support tray for supporting the unit filter cell, against the flow-through unit filter seating structure, the filter support tray being disposed a distance from the unit filter seating structure and movable toward and away from the unit filter seating structure;
- at least one pair of stationary support brackets disposed in the housing, each stationary support bracket being located on opposite sides of the filter support tray from one another;
- at least one rod spanning the distance between the pair of stationary support brackets, the rod being mounted to the support brackets for translation in a direction transverse to its longitudinal axis toward and away from the unit filter seating structure;
- means for mounting the unit filter support tray to the rod so that the unit filter support tray will move with the rod toward and away from the unit filter seating structure;
- at least one pair of actuating levers, the actuating levers of the pair being disposed on opposite sides of the filter tray from one another, each actuating lever being pivotally attached at one of its ends to the support bracket which is on the same side and adjacent the location thereon at which the rod is mounted to the support bracket;
- at least one pair of follower levers, the follower levers of the pair being disposed on opposite sides of the filter tray from one another, each follower lever being connected at one of its ends to the rod for pivotal movement, each follower lever also being structurally associated with the actuating lever which is on the same side of the filter tray so that the follower lever will pivot with the actuating lever;
- means for pivotally moving each actuating lever selectively in either rotational direction about its point of pivotal attachment to the bracket; and,
- means for moving each follower lever toward the unit filter seating structure as the actuating lever and connected follower lever rotate together about their respective pivot points in one direction thereby causing the filter support tray to move with the follower levers toward the unit filter sealing structure and clamping a unit filter cell supported on the filter support tray against the flow through unit filter seating structure.

BRIEF DESCRIPTION OF THE DRAWINGS

A better understanding of the present invention will be had upon reference to the accompanying specification and the following drawings wherein like numerals refer to like parts throughout the several views, and in which:

FIG. 2 is a cross-sectional top view as viewed in the direction of arrows 2—2 in FIG. 1;

FIG. 4 is a perspective view of the filter support and lifting tray component of the filter clamping device of the present invention;

FIG. 5 is an enlarged side view of the actuating bar component of the present invention;

DETAILED DESCRIPTION OF THE PREFERRED EMBODIMENT

Figure 1:
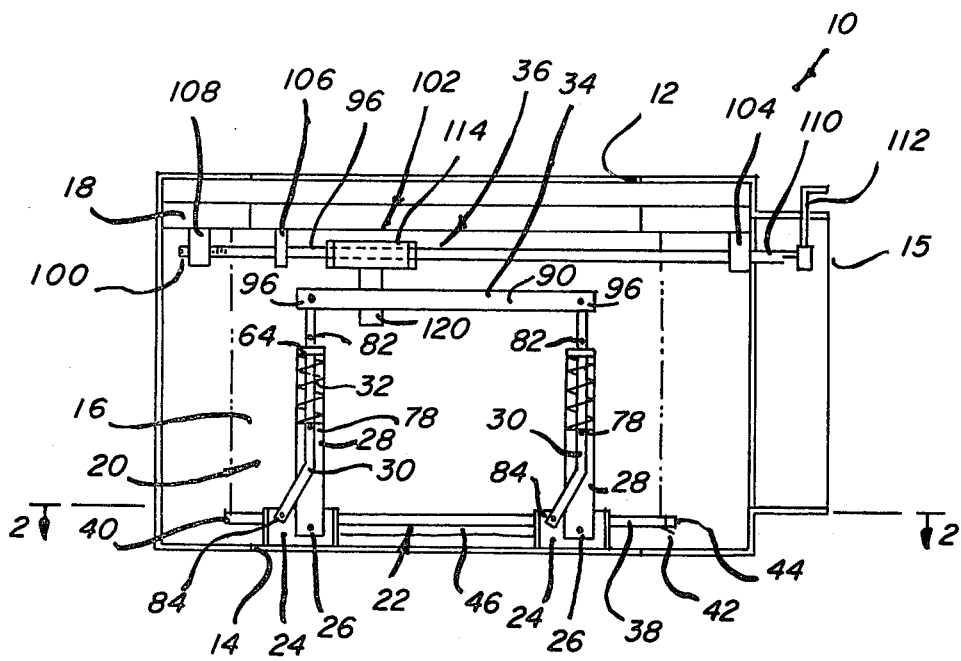
FIG. 1 is a cross-sectional side view of a flow-through filter housing showing a side view of the unit filter clamping device of the present invention in a filter clamping position.
Figure 3:
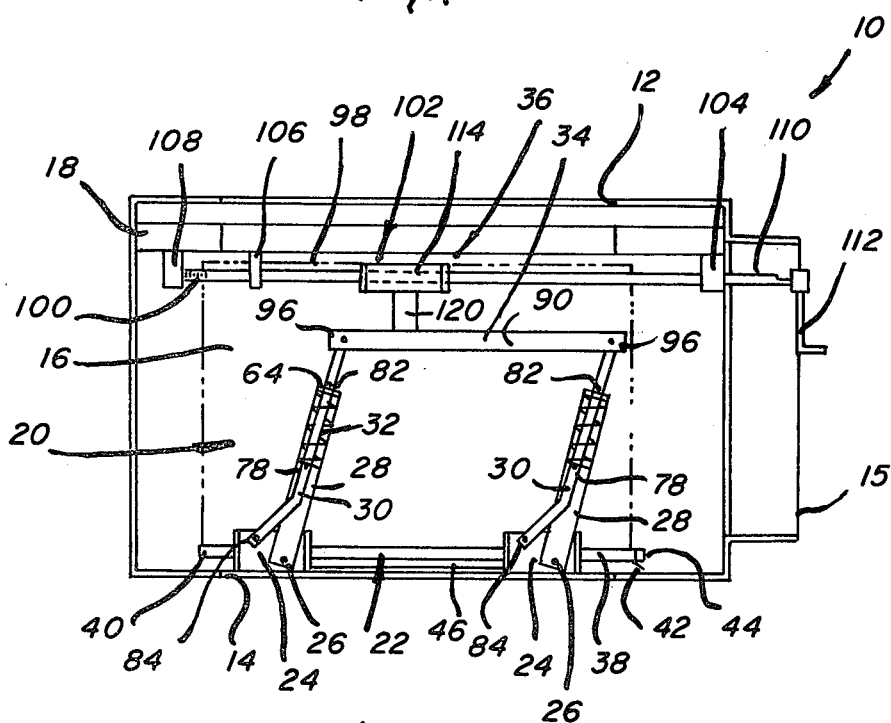
FIG. 3 is a cross-sectional side view of a flow-through filter housing showing a side view of the unit filter clamping device of the present invention in a filter released position.

With reference to FIGS. 1, 2 and 3, there is illustrated a filter housing 10 having a dirty gas stream inlet aperture 12 formed in one of its walls, a clean gas outlet aperture 14 formed in another of its walls generally opposite the dirty gas inlet aperture 12, and a closeable access aperture 15 formed in yet another of its walls generally between the inlet aperture 12 and outlet aperture 14.

A unit filter cell 16, shown in broken lines in FIGS. 1 and 3, is removably disposed within the housing between the dirty gas inlet aperture 12 and the clean gas outlet aperture 14 to remove contaminates from a gas stream flowing through the housing.

The unit filter cell 16 is installed and removed from the housing 10 through the access aperture 15. The access aperture is closed by means of a cover plate (not shown).

As can be best seen in FIGS. 1 and 3, a flow-through filter seating structure 18 is, typically, disposed in the housing adjacent to and in line with the dirty gas inlet aperture 12, and the unit filter cell 16 is removably clamped tightly against this seating structure 18 by means of a filter cell clamping means, generally denoted as the numeral 20, creating a gas tight seal between the filter cell 16 and flow-through structure 18. A gasket (not shown) can be disposed at the interface of the filter cell 16 and flow-through support structure 18 to further assure a gas tight seal.

The unit filter cell clamping means 20 is comprised of a movable filter support tray 22, disposed in the housing proximate the clean gas outlet aperture 14, and means for moving the filter support tray 22 toward and away from the flow-through filter seating structure 18. When the filter support tray 22 is moved toward the flow-through filter seating structure 18, the unit filter cell is moved into sealing abutment with the seating structure 18 and, likewise, when the support tray 22 is moved away from the flow-through filter seating structure 18 the unit filter cell is moved out of abutment with the seating structure.

The means for moving the filter support tray comprises two pair of stationary support brackets 24, the brackets of each pair being located on opposite sides of the filter support tray 22, and a pair of rods 26, each rod spanning the distance between a different pair of brackets 24 and being rotatably mounted to that pair of brackets for rotational movement about its own longitudinal axis. The filter support tray 22 is mounted to and supported by the rods 26 between each pair of brackets. The rods 26 are journal mounted to the filter support tray so that the rods are permitted to rotate about their longitudinal axes. A different first lever arm or follower lever 28 is fixedly connected at one of its ends to each end of each rod 26 proximate each bracket so that as the follower levers 28 are pivoted the rods 26 are caused to simultaneously rotate about their longitudinal axes. The other end of each of the follower levers 28 is a free end. A different second lever arm or actuating lever 30 is pivotally connected at one of its ends to each bracket 24 adjacent to the follower lever 28 proximate that bracket. The other end of each of the actuating levers is a free end. Each actuating lever 30 is also connected, between its ends, to the adjacent follower lever 28, and extends longitudinally past the free end of the adjacent follower lever 28. In addition, biasing means 32 are associated with each follower lever for exerting a force on the follower lever along its longitudinal axis in a direction away from its proximate bracket 24.

The tray moving means further includes two spaced apart parallel tie bars 34 and two spaced apart parallel actuating rod assemblies 36. A different one of the tie bars 34 spans the distance between the two actuating levers 30 pivotally connected to adjacent brackets 24 of different pairs of brackets on one side of the filter support tray 22, and is pivotally connected to the free ends of these actuating levers. The two spaced apart parallel actuating rod assemblies 36 are each mounted for rotational movement about its own longitudinal axis and for linear movement in the direction of its longitudinal axis. Each actuating rod assembly 36 is disposed in parallel juxtaposition to a different one of the tie bars 34 and is connected thereto so that as the actuating rod assemblies 36 move in their longitudinal direction they cause the tie bars 34 to move.

With reference to FIGS. 1, 2, 3 and particularly FIG. 4, the filter support tray 22 is comprised of two parallel spaced apart side rails 38 and an end or stop bar 40 tranversely disposed to the side rails and connected to one end of each side rail. The opposite end of each side rail can be formed with a ramp flange 42 and a pilot flange 44. The filter support tray can also include reinforcement brackets 46 fabricated of lengths of angle iron which are connected to the side rails 38 to add rigidity to the filter support tray structure.

The rods 26, which are also transversely disposed to the side rails 38, are connected to the filter support tray 22 by means of the two rod mounting brackets 46 fabricated of lengths of angle iron. Each mounting bracket 46 is aligned with a different one of the side rails 38 and is connected by one of its legs 48 to the bottom side of that side rail such that its other leg 50 depends from the side rail. The rod mounting brackets 46 can be connected to the rails 38 of the tray 22 by vertually any conventional or otherwise convenient means such as by bolting. The rods 26 fit through appropriate apertures formed in the depending legs 50 of the rod mounting brackets 46 with sufficient clearance to allow them to freely rotate about their longitudinal axes. Further, the rods 26 are of a length to extend outwardly beyond the margin of the support tray defined by the side rails 38, i.e., the rods 26 are longer than the support tray is wide.

With reference to FIGS. 1,2,3,4,9,and 10, each stationary support bracket 24 is comprised of a U-shaped body member 52 and an L-shaped body member 54 disposed in the U-shaped body member. The L-shaped body member 54 is attached at the end of one of its branches, for example by welding, to one of the legs of the U-shaped body member 52 as can be best seen in FIG. 10. A first circular aperture 56 is formed in the cross member 53 of the U-shaped body member 52 and a second circular aperture 58 is formed in the branch 55 of the L-shaped body member 54 which is parallel to the cross member 53 of the U-shaped body member 52. The first aperture 56 and second aperture 58 are coaxially aligned. A third or elongated aperture 60 is formed in the cross-member 53 spaced from the first aperture 56. The brackets 24 are disposed toward the bottom of the housing 10 and are fixedly attached to the housing as by, for example, welding. The brackets are disposed within the housing 10 such that the major axis of the elongated third apertures 60 are oriented substantially in the vertical plane or in the direction of the gas flow through the filter housing 10 between the dirty gas inlet aperture 12 to the clean gas outlet aperture 14. The opposite ends of the rods 26, extending beyond the margin of the filter support tray, are received through the elongated third apertures 60 of the brackets 24 on opposite sides of the filter support tray 22, as can be best seen in FIG. 2, with enough clearance to allow the rods to rotate therein and to move in the vertical plane along the major axis of the elongated third aperture 60.

Figure 6:
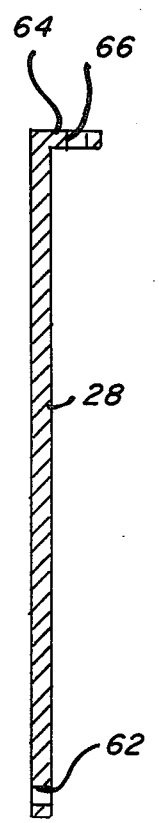
FIG. 6 is an enlarged side view of the follower lever arm component of the present invention.
Figure 7:
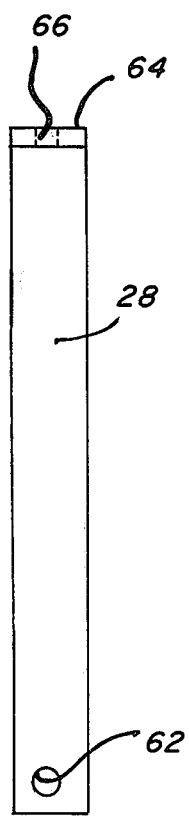
FIG. 7 is an enlarged front view of the follower lever arm of FIG. 6.
Figure 11:
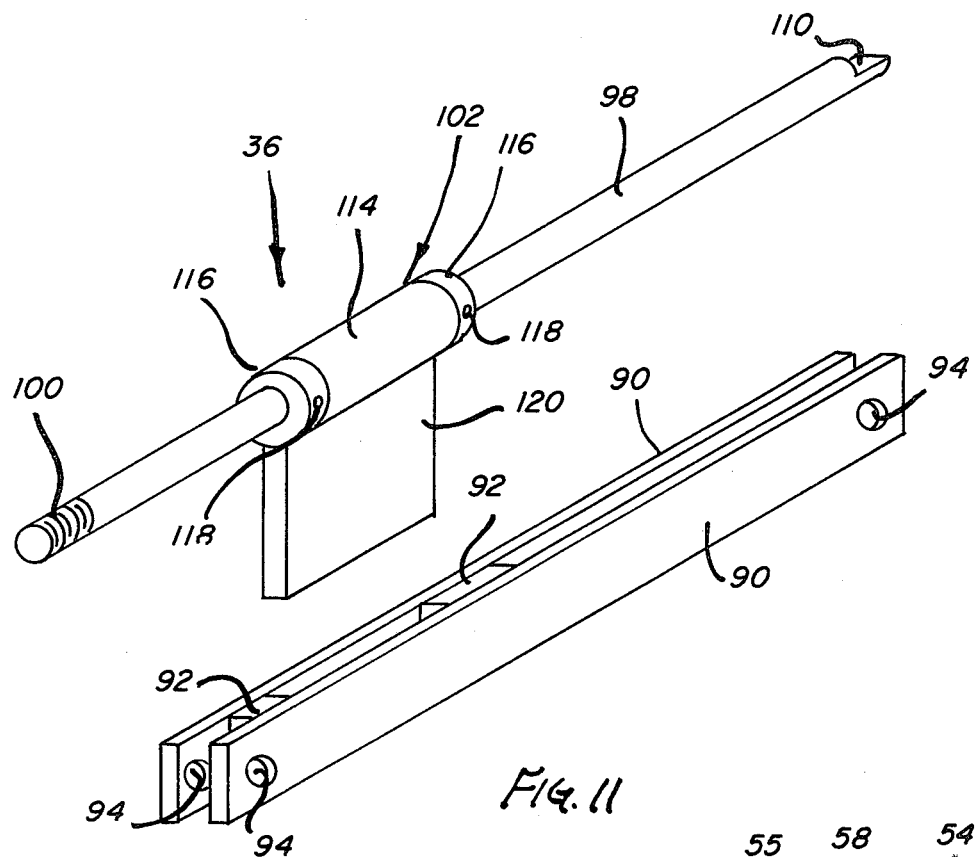
FIG. 11 is an enlarged perspective exploded view of the tie bar and activating rod components of the present invention.
Figure 10:
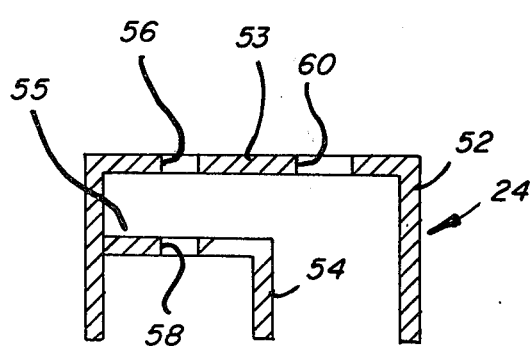
FIG. 10 is a top view of the stationary support bracket of FIG. 8.
Figure 9:
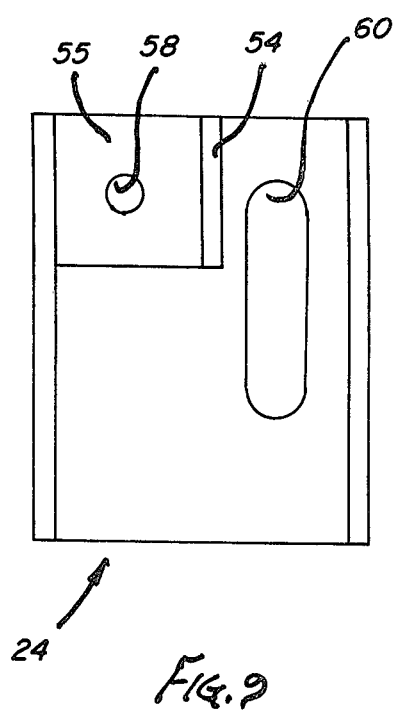
FIG. 9 is an enlarged side view of a stationary support bracket of the present invention.

A first lever arm or follower lever 28 is fixedly connected at one of its ends to an end of the rod 26 at each stationary bracket 24, as can be seen FIGS. 1,2,3 and 8, so that as the follower levers are pivoted, the rods 26 are caused to rotate therewith. With reference to FIGS. 6 and 7, each follower lever 28 is identical and is formed with a rod end receiving aperture 62 at one of its ends and is bent at approximately 90° to the longitudinal axis at is opposite end 64. The bent end 64 is formed with an actuating lever receiving aperture 66 such that the axis of the actuating lever receiving aperture 66 is substantially at a right angle to the rod end receiving aperture 62. The centers of the apertures 62 and 66 also lie on a common longitudinal axes of the follower lever 28. An end of the rod 26 is received through the rod end receiving aperture 62 and is fixedly connected to the follower lever 28 as by, for example, welding.

With reference to FIG. 5, each actuating lever 30 is identical and is bent between its ends at a location represented at the numeral 31 so that the actuating lever 30 resembles a dogs leg in shape. This bend 31 is preferrably closer to one end of the actuating lever than the opposite end. Thus, the actuating lever has one long arm 68 and one shorter arm 70. The longitudinal axis of the shorter arm 70 is preferrably oriented at an angle of approximately 30° to the longitudinal axes of the longer arm 68. An axle receiving aperture 72 is formed in one end of the actuating lever and a pivot pin receiving aperture 74 is formed in the opposite end. Preferrably, the axle receiving aperture 72 is formed in the shorter arm 70 and the pivot pin receiving aperture 74 in the longer arm 68. In addition, a spring keeper means is located along the actuating lever 30 on the longer arm 68 between the bend 31 and pivot pin receiving aperture 74. This spring keeper means comprises a keeper pin receiving aperture 76 formed through the actuating lever 30 and a keeper pin 78 (see FIGS. 1, 3 and 8) received through the keeper pin receiving aperture to extend outwardly from both ends of the aperture 76. Further, a follower lever stop means is located along the actuating lever 30 on the longer arm 68 between the keeper pin receiving aperture 76 and the pivot pin receiving aperture 74. The follower lever stop means comprises a stop pin receiving aperture 80 formed through the actuating lever 30 and a stop pin 82 (see FIGS. 1, 3 and 8) received through the stop pin receiving aperture 80 to extend outwardly from both ends of the aperture 80.

With continued reference to FIGS. 1,2,3,5 and 8, an actuating lever 30 is pivotally connected to each bracket 24 by means of an axle pin 84 which extends through the first aperture 56 in the cross-member 53 of the U-shaped body member 52, through the axle receiving aperture 72 in the shorter arm 70 of the actuating lever, and through the second aperture 58 is the branch 55 of the L shaped body member 54. Further, the longer arm 68 of the actuating lever 30 extends generally parallel to and in overlaying relationship with the follower lever 28 and is axially received through the actuating lever receiving aperture 66 in the bent end 64 of the follower lever. The longer arm 68 of the actuating lever 30 projects longitudinally past the bent end 64 of the follower lever 28 such that the stop pin 82 on the longer arm 68 will abut the bent end 64. Biasing means, such as a coil compression spring 32 is concentrically located over the longer arm 68 of the actuating arm 30 and captured between the keeper pin 78 and bent end 64 of the follower lever 28.

Figure 8:
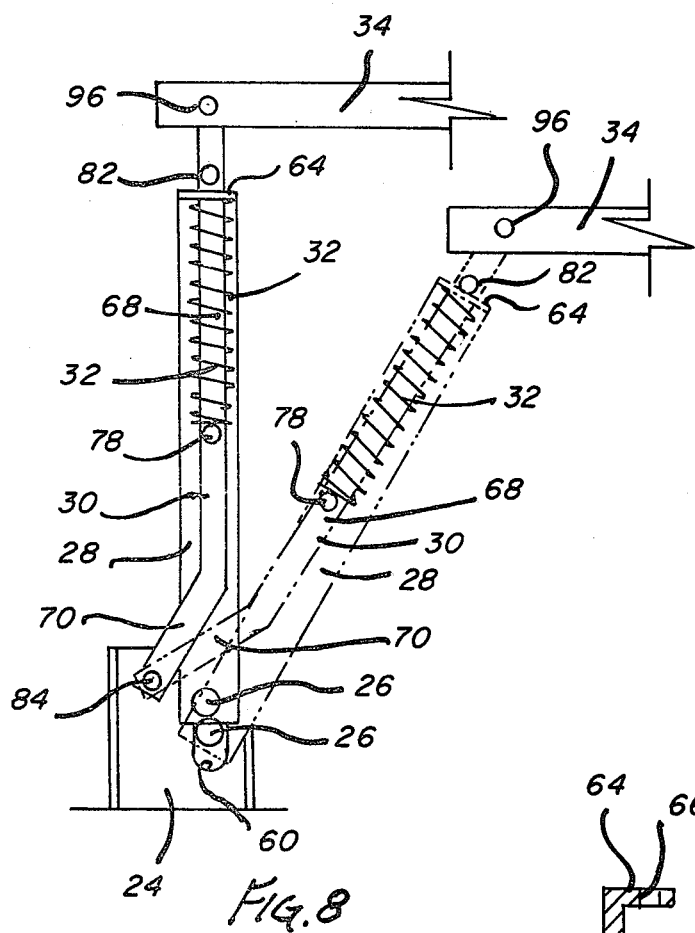
FIG. 8 is an enlarged side view of the actuating bar and follower arm assembled.

With reference to FIGS. 1,3,8 and particularly to 11, each tie bar 34 is identical and comprises two closely spaced, parallel bar elements 90 and two spacer blocks 92 disposed between the bar elements 90 and spaced from each other in the longitudinal direction of the tie bar. These spacer blocks can be attached to the bar elements 90 by vertually any convential or otherwise convenient means such as, for example, by welding. Further, each bar element 90 is formed with two pivot pin receiving apertures 94, one at each end. The pivot pin receiving apertures 94 formed in adjacent ends of the two bar elements 90 of a tie bar 34 are coaxial. The end of the longer arm 68 of a different actuating lever 30 is received between the spaced bar elements 90 at each end of a tie bar 34. Each actuating lever is connected to a tie bar 34 by means of a pivot pin 96 received through the pivot pin receiving apertures 94 in the bar elements 90 and the pivot pin receiving aperture 74 in the longer arm 68 of the actuating lever 30. The pivot pins 96 fit through the pivot pin receiving apertures 74 in the longer arm 68 of the actuating levers 30 with adequate clearance to allow the actuating lever to pivot relative to the pivot pins 96.

With reference to FIGS. 1,3,8 and particularly 11, each actuating rod assembly 36 is comprised of a cylindrical rod 98 having one threaded end 100, and a tie bar actuating fixture 102 rotatably mounted on the cylindrical rod 98. The cylindrical rods 98 are mounted to the housing 10 in parallel juxtaposition to each other end to the tie bars 34 for rotation about their own longitudinal axes.

Each cylindrical rod 98 is mounted to the housing 10 by means of, for example, two bearings 104 and 106 spaced from one another along the longitudinal axis of the cylindrical rod 98. The first bearing 104 can be disposed proximate the end of the cylindrical rod 98 opposite its threaded end 100 and the second bearing 106 can be disposed between the cylindrical rod ends but preferrably closer to the threaded end 100. These bearings 104 and 106 can be affixed to the housing 10 by vertually any conventional or otherwise conventional means such as, for example, welding. The threaded end 100 of the cylindrical rod 98 is threadably engaged in a complimentary threaded bore in a fixture 108. The threaded fixture 108 is attached to the housing by, for example, welding. The end 110 of the cylindrical rod 98 opposite the threaded end 100 projects through the housing 10 and is configured to removably accept a crank handle 112 so that the cylindrical rod 98 can be rotated about its own longitudinal axes from outside the housing. The configuration of the end 110 of the cylindrical rod 98 can take virtually any conventional or otherwise convenient shape. For example, a flat surface can be formed at one side of the rod 98 to mate with a like flat surface formed in the socket portion of the crank handle 112.

The tie bar actuating fixture 102 comprises a cylindrical collar 114 coaxially receiving the cylindrical rod 98. The inside diameter of the cylindrical collar 114 is sufficiently larger than the diameter of the cylindrical rod 98 to allow the rod 98 to freely rotate about its own longitudinal axis relative to and inside the cylindrical collar 114. Further, the cylindrical collar 114 is fixed along the longitudinal axis of the cylindrical rod 98 so that the cylindrical collar 114 cannot inadvertently move along the cylindrical rod 98. The means for fixing the cylindrical collar 114 comprises a pair of set collars 116 receiving the cylindrical rod 98 and disposed at opposite ends of the cylindrical collar 114. Each set collar 116 includes a radially oriented threaded bore receiving a set screw 118. The set screws 118 are threaded into abutment against the cylindrical rod 98, thus, preventing the set collars from moving along the cylindrical rod 98. For the reason that the cylindrical collar 114 is caged between the set collars 116, it is also prevented from moving along the cylindrical rod 98. Further, the actuating fixture 102 also includes means for engaging the tie bars 34 so that the tie bars are caused to move with the cylindrical rod 98. This means for engaging the tie bars comprises a tongue 120 radially projecting from the cylindrical collar 114 and extending into the space between the two spacers blocks 92 of the tie bar 34. The tongue 120 can be of unitary structure with the cylindrical collar 114 or may be a separate element attached to the cylindrical collar 114 by virtually any conventional or otherwise convenient method such as by welding.

In operation and starting with the filter clamping means in the open unclamped or released position with the filter support tray 22 in its lowest or most remote location relative to the filter seating structure 18 as illustrated in FIG. 3, and in phantom lines in FIG. 8, a clean unit filter cell 16 is moved through the access aperture 14 of the housing 10 and placed on the filter support tray 22.

A crank handle 112 is next connected to the end 110 of the each cylindrical rod 98 and turned in, for example, a clockwise direction causing the cylindrical rod 98 to rotate with the handle about its longitudinal axis. As the cylindrical rod 98 rotates about its longitudinal axis, the threaded end 100 is threaded into the threaded bore of the threaded fixture 108 causing the cylindrical rod 98 to move in a longitudinal direction, or to the left in FIG. 3 and FIG. 8.

The set collars 116, being fixed to the cylindrical rod 98, rotate with and move longitudinally with the cylindrical 98, and because the set collars 116 cage the cylindrical collar 114, the cylindrical collar 114 also moves longitudinally with the longitudinal movement of the cylindrical rod 98, however, the cylindrical collar does not rotate with the cylindrical rod 98.

As the cylindrical collar 114 moves with the cylindrical rod 98, the tongue 120 pushes against one of the spacer blocks 92 causing the tie bar 34 to move with the actuating rod 36, or to the left in FIG. 3 and fiture 8. The tie bar 34 has a combined motion of translation and a motion of rotation as can be best seen comparing FIGS. 1 and 3 and in FIG. 8 wherein, again, the phantom lines show the filter clamping means in an unclamped or released position and the solid lines show the filter clamping means in a filter clamping position.

The movement of the tie bars 34 in turn cause each of the actuating levers 30 to pivot about the axle pin 84 connecting the actuating lever 30 to the stationary bracket 24. As viewed in FIGS. 1, 3 and 8, this pivotal movement is counter-clockwise. The actuating levers 30 also pivot, relative to the tie bars 34, about the pivot pins 96 connecting them to the tie bars 34 as the tie bars move in a combined motion of rotation and translation.

Each actuating lever 30, being connected to a follower lever 28 by being axially received through the actuating lever receiving aperture 66 in the bent end 64 of the follower lever 28, causes the follower lever 28 to move with the actuating lever 30. However, the follower levers 28 pivot about the longitudinal axis of the rod 26 to which it is attached and which is received through the elongated slots 60 formed in the brackets 24.

As an actuating lever 30 pivots about its axle pin 84 and its associated follower lever 28 pivots about a rod 26, the compression spring 32 exerts opposite forces against the fixed spring keeper pin 78 attached to the actuating lever 30 and the bent end 64 of the follower lever 28. The biasing force exerted by the compression spring 88 against the bent end 64 moves the follower lever 28 along the longitudinal axis of longer arm 68 the actuating lever 30 toward the stop pin 82 mounted to the actuating lever. As the follower lever 28 moves along the aixs of the longer arm 68 it moves the rods 26 upwardly or toward the filter seating structure 18 in the elongated apertures 60 and along the longitudinal axis of the elongated aperture 60 formed in the brackets 24.

As the rods 26 move in the elongated apertures 60 toward the filter seating structure 18, they carry the filter support tray 22 with them.

Of course, to lower or move the filter support tray away from the filter seating structure 60, the crank handle 112 is turned in the opposite direction and the above described interaction of components is repeated but in the opposite direction.

With reference to the filter clamping means in a filter clamping position, ie, with the filter support tray 22 in its uppermost or closest position to the unit filter seating structure 18 and without a unit filter cell in position on the filter support tray, the depth of the unit filter cell 16 is greater than the distance between the flow-through filter seating structure 18 and the filter support tray 22. Thus, with a unit filter cell 16 in position on the filter support tray 22, the follower levers 28 are stopped short of the point at which the bent ends 64 would otherwise contact the stop pins 82 on the actuating arms. Therefore, the distance between the bent end 64 of the follower lever 28 and the spring keeper pin 78 on the actuating arm 30 with a unit filter 16 supported on the support tray 72 is less than the distance between them when the filter clamping means is in the released or unclamped position. This can be clearly seen in FIG. 8. The result is that the compression spring 88 is compressed more when the filter clamping means is in the filter clamping position with a filter 16 supported on the support tray 22 than when in the filter unclamped or release position. Thus, the compression spring 32, through the follower levers 28, and filter support tray 22, constantly and uniformly forces the filter cell 16 against the filter seating structure 18.

The foregoing detailed description is given primarily for clarity of understanding and no unnecessary limitations should be understood therefrom for modifications will be obvious to those skilled in the art upon reading this disclosure and may be made without departing from the spirit of the invention of the scope of the appended claims.

What is claimed is:

1. A unit filter clamping device for removably clamping a unit filter cell in position against a flow through unit filter seating structure located in a housing, the unit filter clamping device comprising:

a movable filter support tray for supporting the unit filter cell against the flow-through unit filter seating structure, the filter support tray being disposed a distance from the unit filter seating structure and movable toward and away from the unit filter seating structure;

at least one pair of opposing stationary support brackets being affixed in the housing, each stationary support bracket being located on opposite sides of the filter support tray from one another;

a rod spanning the distance between each pair of stationary support brackets, each rod being mounted to said pair of support brackets for translation in a direction transverse to its longitudinal axis toward and away from the unit filter seating structure;

means for mounting the unit filter support tray to each rod so that the unit filter support tray will move with each rod toward and away from the unit filter seating structure;

a pair of opposing actuating levers positioned with respect to each pair of stationary support brackets and disposed on opposite sides of the filter tray from one another, each actuating lever being pivotally attached at one of its ends to said pair of support brackets;

a pair of opposing follower levers positioned with respect to each pair of support brackets and disposed on opposite sides of the filter tray from one another, each of said follower levers being pivotally connected at one of its ends to the rod mounted to said pair of support brackets and being structurally positioned with respect to the actuating lever and pivotally attached to one of said support brackets on the same side of the filter tray so that the follower lever will pivot with the actuating lever;

means for pivotally moving each actuating lever selectively in either rotational direction about its point of pivotal attachment to said one of the support brackets; and, means for moving each follower lever toward the unit filter seating structure as the actuating levers and connected follower levers rotate together about their respective pivot points in one direction thereby causing the filter support tray to move with the follower levers toward the unit filter sealing structure and clamping a unit filter cell supported on the filter support tray against the flow through unit filter seating structure.

2. The unit filter clamping means of claim 1, wherein the means for pivotally moving the actuating levers comprises:

a pair of tie bars, each tie bar being pivotally connected to a different one of the actuating levers proximate the end thereof opposite the end which is pivotally attached to one of said at least one pair of stationary brackets; and, means for moving the pair of tie bars in a combination rotation motion and translation motion.

3. The unit filter clamping means of claim 2, wherein the means for moving the pair of tie bars in a combination rotation motion and translation motion comprises:

a pair of actuating rod assemblies, each actuating rod assembly being generally parallel to a different one of the tie bars, each actuating rod assembly being mounted in the housing for movement in the direction of its own longitudinal axis, each actuating rod assembly having one end passing through the housing to the exterior of the housing, and each actuating rod assembly being structurally connected to a different one of the tie bars to impart a combined rotation and translation motion to the tie bar as the actuating rod assembly moves in the direction of its longituding axis; and, means for moving each actuating rod assembly in the direction of its longitudinal axis from outside the housing.

4. The unit filter clamping means of claim 3, wherein each of the actuating rod assemblies comprise:

a cylindrical rod mounted to the housing for rotational movement about its own longitudinal axis and movement in the direction of its own longitudinal axis;

a cylindrical collar coaxially mounted to the cylindrical rod so that the cylindrical rod will freely rotate about its own longitudinal axis relative to the cylindrical collar;

means attaching the cylindrical collar to the cylindrical rod so that the cylindrical collar will move with the cylindrical rod as the cylindrical rod moves in the direction of its own longitudinal axis; and, means connecting the cylindrical collar to a tie bar to cause the tie bar to move in a combined and translation motion as the cylindrical rod moves in the direction of its own longitudinal axis.

5. The unit filter clamping means of claim 4, wherein the means connecting the cylindrical collar to a tie bar comprises:

an aperture formed through each tie bar; and, a tongue projecting from the cylindrical collar and received in the aperture formed in the tie bar.

6. The unit filter clamping means of claim 5 further comprising a stationary fixture having a threaded bore formed therein; and, one end of each cylindrical rod is threaded and received in the threaded bore in the stationary fixture so that as the cylindrical rod is rotated about its own longitudinal axis, the cylindrical rod advances into and out of the threaded bore due to the coaction of the threaded end of the cylindrical rod and threaded bore in the stationary fixture resulting in the cylindrical bar moving in the direction of its own longitudinal axis.

7. The unit filter clamping means of claim 1, wherein the means for moving the follower lever toward the unit filter seating structure comprises biasing means coacting with each actuating lever and follower lever connected thereto to exert a biasing force on the follower lever in a direction of the longitudinal axis of the follower lever toward the unit filter seating structure.

8. The unit filter clamping means of claim 7, wherein:

a least a portion of the length of each actuating lever overlies in parallel juxtaposition at least a portion of the length of the follower lever connected to that actuating lever;

a first spring keeper affixed to each of the actuating levers along the length thereof which overlies, at least a portion of the length of the connected follower lever, and located between the end of the actuating lever which is pivotally attached to the stationary support brackets and the end of the adjacent follower lever opposite the end thereof which is connected to the rod;

a second spring keeper affixed to each follower lever proximate the end thereof which is opposite the end of the follower lever attached to the rod;

the biasing means comprises a compression spring captured between the first spring keeper and the second spring keeper thereby exerting a force biasing the follower lever in the direction of its longitudinal axis; and, a follower lever stop affixed to that portion of each actuating lever which extends beyond the end of the adjacent follower lever and disposed to contact that end of the follower lever to limit the movement of the follower lever in the longitudinal direction of the actuating lever.

9. The unit filter clamping means of claim 8, wherein each stationary support bracket comprises a vertically oriented elongated slot formed therein having its longitudinal axis oriented perpendicular to the rod and in a direction toward the flow-through unit filter seating structure, the elongated slot of each bracket sized to receive the rod with enough clearance to allow the rod to translate perpendicular to the longitudinal axis of the rod and along the longitudinal axis of the slot toward and away from the unit filter seating structure.

10. The unit filter clamping means of claim 9, wherein the rod is mounted to the support brackets for rotation about its own longitudinal axis.

* * * * *